United States Patent [19]
Hosoya

[11] Patent Number: 5,461,719
[45] Date of Patent: Oct. 24, 1995

[54] METHOD FOR RECORDING/REPRODUCING INFORMATION ON RECORDING MEDIUM IN ACCORDANCE WITH PARAMETERS STORED IN MEMORY TO ALLOW SECTORS OF DIFFERENT DATA CAPACITIES TO COLLECTIVELY EXIST

[75] Inventor: Hideki Hosoya, Yokohama, Japan

[73] Assignee: Canon Kabushiki Kaisha, Tokyo, Japan

[21] Appl. No.: 914,588

[22] Filed: Jul. 20, 1992

[30] Foreign Application Priority Data

Jul. 23, 1991 [JP] Japan ..................... 3-205659

[51] Int. Cl.⁶ ..................... G06F 13/12; G06F 12/00
[52] U.S. Cl. ..................... 395/439; 395/500; 395/894; 395/497.04; 235/454; 369/272; 364/245.1; 364/249.4; 364/261.2; 364/DIG. 1
[58] Field of Search ..................... 395/275, 425, 395/575, 500; 360/53, 39, 51, 48, 78.04; 369/32, 59, 54, 275.4, 272; 235/454, 487

[56] References Cited

U.S. PATENT DOCUMENTS

| | | | |
|---|---|---|---|
| 4,562,495 | 12/1985 | Bond et al. | 360/78.04 |
| 4,601,012 | 7/1986 | Aiken, Jr. | 395/575 |
| 4,931,628 | 6/1990 | Wada | 235/454 |
| 4,958,314 | 9/1990 | Imai et al. | 395/425 |
| 4,965,440 | 10/1990 | Hasegawa | 235/487 |
| 5,040,165 | 8/1991 | Taii et al. | 369/275.4 |
| 5,111,444 | 5/1992 | Fukushima et al. | 369/58 |
| 5,271,018 | 12/1993 | Chan | 371/10.2 |

FOREIGN PATENT DOCUMENTS

| | | |
|---|---|---|
| 0323227 | 7/1989 | European Pat. Off. . |
| 0410462 | 1/1991 | European Pat. Off. . |
| 2220509 | 1/1990 | United Kingdom . |

OTHER PUBLICATIONS 01-320522—Japanese Abstract Dec. 26, 1989.

Primary Examiner—Thomas C. Lee
Assistant Examiner—Le Hien Luu
Attorney, Agent, or Firm—Fitzpatrick, Cella, Harper & Scinto

[57] ABSTRACT

Either one of recording or reproduction of data is effected by use of an information processing system that includes a recording/reproducing apparatus for effecting at least one of recording of data on or reproduction of data from a recording medium on which a plurality of tracks are provided, a controller for controlling the recording/reproducing apparatus and a host computer connected to the controller via a small computer interface. A partition command is sent from the host computer to the controller through the small computer interface so that the data tracks are divided into a plurality of logical partitions to designate the sector size to be used in each partition. The parameters for the partition division and the sector size are stored in the memory in the controller on the basis of the partition command signal sent from the host computer. A selection command for designating either one of the divided partitions is sent from the host computer to the controller via the small computer interface. The controller controls the information recording/reproducing apparatus so as to effect either one of recording of data on or reproduction of data from the data track in the partition designated by the selected command according to the parameters stored in the memory.

6 Claims, 8 Drawing Sheets

| BIT<br>BYTE | 7 | 6 | 5 | 4 | 3 | 2 | 1 | 0 |
|---|---|---|---|---|---|---|---|---|
| 0 | NUMBER OF PARTITION |||||||||
| 1 | PARTITION NUMBER ||||||||
| 2 | (MSB) | FIRST PHYSICAL TRACK ADDRESS |||||||
| 3 | FIRST PHYSICAL TRACK ADDRESS | | | | | | | (LSB) |
| 4 | (MSB) | NUMBER OF PHYSICAL TRACK |||||||
| 5 | NUMBER OF PHYSICAL TRACK | | | | | | | (LSB) |
| 6 | SECTOR TYPE (IN ASCII) ||||||||
| 7 | ECC MODE ||||||||
| 8~n | ASSIGN INFORMATION CORRESPONDING TO THE ABOVE BYTE 1-7 TO EACH PARTITION ||||||||

| BYTE \ BIT | 7 | 6 | 5 | 4 | 3 | 2 | 1 | 0 |
|---|---|---|---|---|---|---|---|---|
| 0 | \multicolumn{8}{c|}{OPERATION CODE (C3H)} |
| 1 | \multicolumn{3}{c|}{LOGICAL UNIT NUMBER} | \multicolumn{5}{c|}{RESERVED (0)} |
| 2 | \multicolumn{8}{c|}{RESERVED (0)} |
| 3 | (MSB) \multicolumn{8}{c|}{PARAMETER LIST LENGTH} |
| 4 | \multicolumn{8}{c|}{PARAMETER LIST LENGTH (LSB)} |
| 5 | 0 | 0 | \multicolumn{4}{c|}{RESERVED (0)} | 0 | 0 |

FIG. 5

| BIT BYTE | 7 | 6 | 5 | 4 | 3 | 2 | 1 | 0 |
|---|---|---|---|---|---|---|---|---|
| 0 | NUMBER OF PARTITION ||||||||
| 1 | PARTITION NUMBER ||||||||
| 2 | (MSB) FIRST PHYSICAL TRACK ADDRESS ||||||||
| 3 | FIRST PHYSICAL TRACK ADDRESS (LSB) ||||||||
| 4 | (MSB) NUMBER OF PHYSICAL TRACK ||||||||
| 5 | NUMBER OF PHYSICAL TRACK (LSB) ||||||||
| 6 | SECTOR TYPE (IN ASCII) ||||||||
| 7 | ECC MODE ||||||||
| 8 ~ n | ASSIGN INFORMATION CORRESPONDING TO THE ABOVE BYTE 1-7 TO EACH PARTITION ||||||||

FIG. 6

| BIT BYTE | 7 | 6 | 5 | 4 | 3 | 2 | 1 | 0 |
|---|---|---|---|---|---|---|---|---|
| 0 | \multicolumn{8}{c|}{OPERATION CODE (C5H)} |
| 1 | \multicolumn{3}{l|}{LOGICAL UNIT NUMBER} | \multicolumn{5}{l|}{RESERVED (0)} |
| 2 | \multicolumn{8}{c|}{RESERVED (0)} |
| 3 | \multicolumn{8}{c|}{RESERVED (0)} |
| 4 | \multicolumn{8}{c|}{PARTITION NUMBER} |
| 5 | 0 | 0 | \multicolumn{4}{l|}{RESERVED (0)} | 0 | 0 |

METHOD FOR RECORDING/REPRODUCING INFORMATION ON RECORDING MEDIUM IN ACCORDANCE WITH PARAMETERS STORED IN MEMORY TO ALLOW SECTORS OF DIFFERENT DATA CAPACITIES TO COLLECTIVELY EXIST

BACKGROUND OF THE INVENTION

1. Field of the Invention

The invention relates to a recording and/or reproducing method of recording and/or reproducing predetermined data to a recording medium on the basis of a command which is sent from a host computer through an SCSI (Small Computer System Interface).

2. Related Background Art

SCSI is an interface which has been deliberated in the X3T9.2 Work Committee of ANSI (American National Standard Institute) on the basis of the interface SASI (Shugart Associates System Interface) for connecting a small computer and its peripheral apparatuses made by Shugart Co., Ltd. in the U.S.A. and has been standardized as ANSI X3.131-1986. The SCSI is at present becoming a standard interface for connecting a personal computer and its peripheral apparatuses. In recent years, the work to standardize SCSI-2 as an expanded version of SCSI has progressed. A final decision of SCSI-2, however, has not yet made at the present point in time. There are the following five ranges of the SCSI interface rules which are specified by the ANSI.

(1) The kinds and definitions of interface signals and timings for transmission and reception of the signals.

(2) A protocol to specify the operation sequence as an interface and definitions of phases and the like.

(3) Physical interface conditions such as cable specifications, connector specifications, and the like, and electrical conditions of the transmitting system.

(4) Command systems to execute various controls of peripheral apparatuses and data transfer, formats of commands, functions of commands.

(5) A status byte format to inform the result of execution of the command to a host computer, and a structure of sense data to inform an abnormality state or the like during the execution of the command.

The command system in the above item (4) is as follows. First, an SCSI command is classified into eight kinds of groups. The first byte of a CDB (Command Descripter Block) indicates an operation code. Upper three bits of the first byte designate a group code and lower five bits designate a command code (code indicative of the kind of command) of each group. A length of CDB is specified for every group in the following manner.

| | |
|---|---|
| (1) group 0 | 6 bytes |
| (2) group 1 | 10 bytes |
| (3) groups 2–4 | reserved |
| (4) group 5 | 12 bytes |
| (5) groups 6–7 | vendor unique (specified by the manufacturer) |

The CDB of groups 6 and 7 is a group of commands which can be defined so as to be unique to the SCSI device. In each command, a logic block address is constructed by continuously arranging data blocks each having a fixed length on a logical unit.

Figure 1:
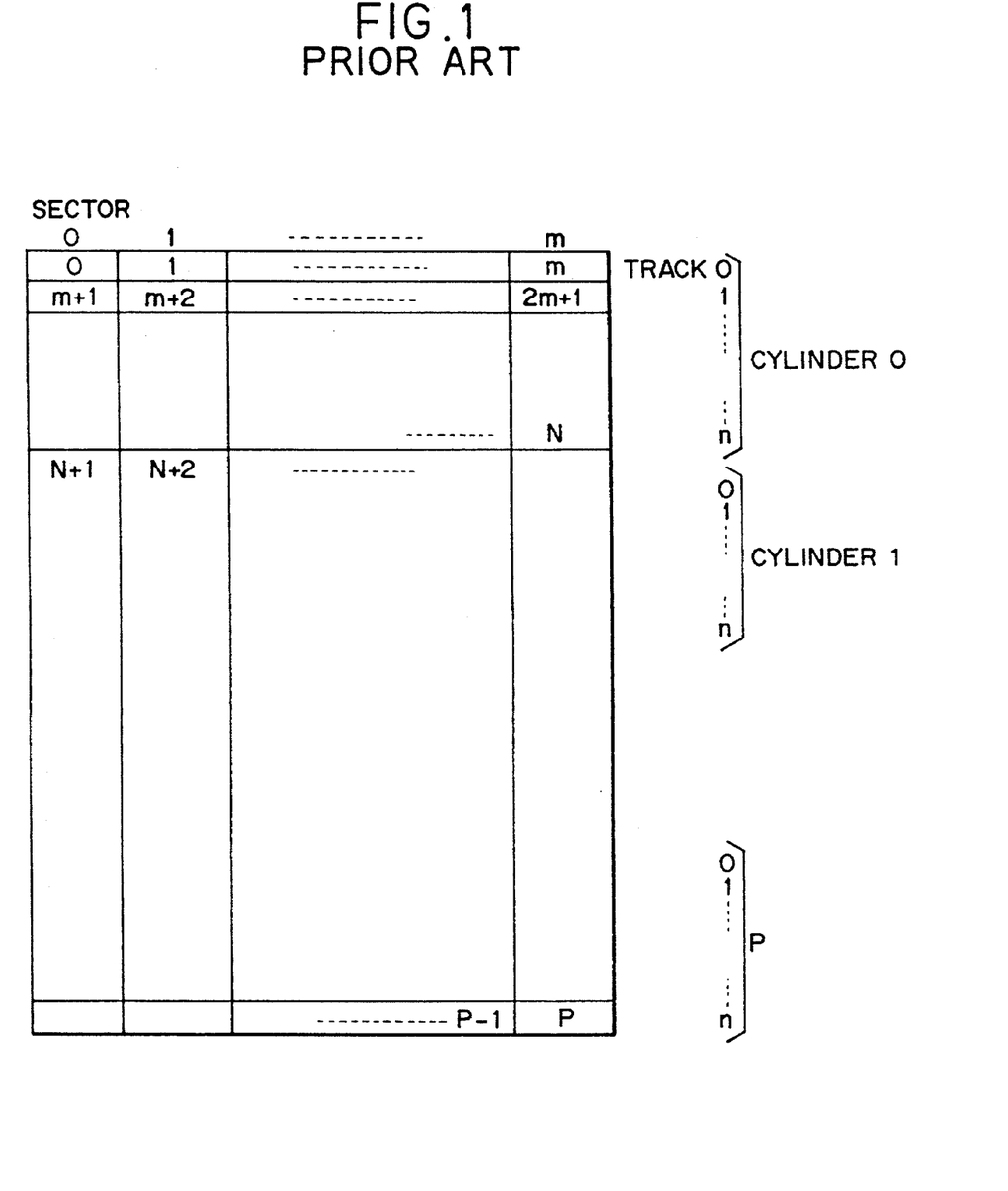
FIG. 1 is a schematic diagram showing a construction of logic blocks in a conventional hard disc device.

FIG. 1 is a diagram showing a construction of a logic block in a hard disk device. In FIG. 1, a data block of a cylinder=0 and a sector=0 is set to a logic block address=0. The logic block address is increased by "1" each time each of the sector, track, and cylinder is increased by "1" in accordance with this order. An excellent point of the logic block address is that there is no need to be aware of a physical structure because an initiator (host computer) designates the logic block address of the first data block and the number of processing blocks and accesses the data. When the logic block addressing is used, therefore, in the case where the devices in which the number of cylinders, tracks, sections, and the like are mutually different are connected, they can be made operative by the same software.

Figure 2:
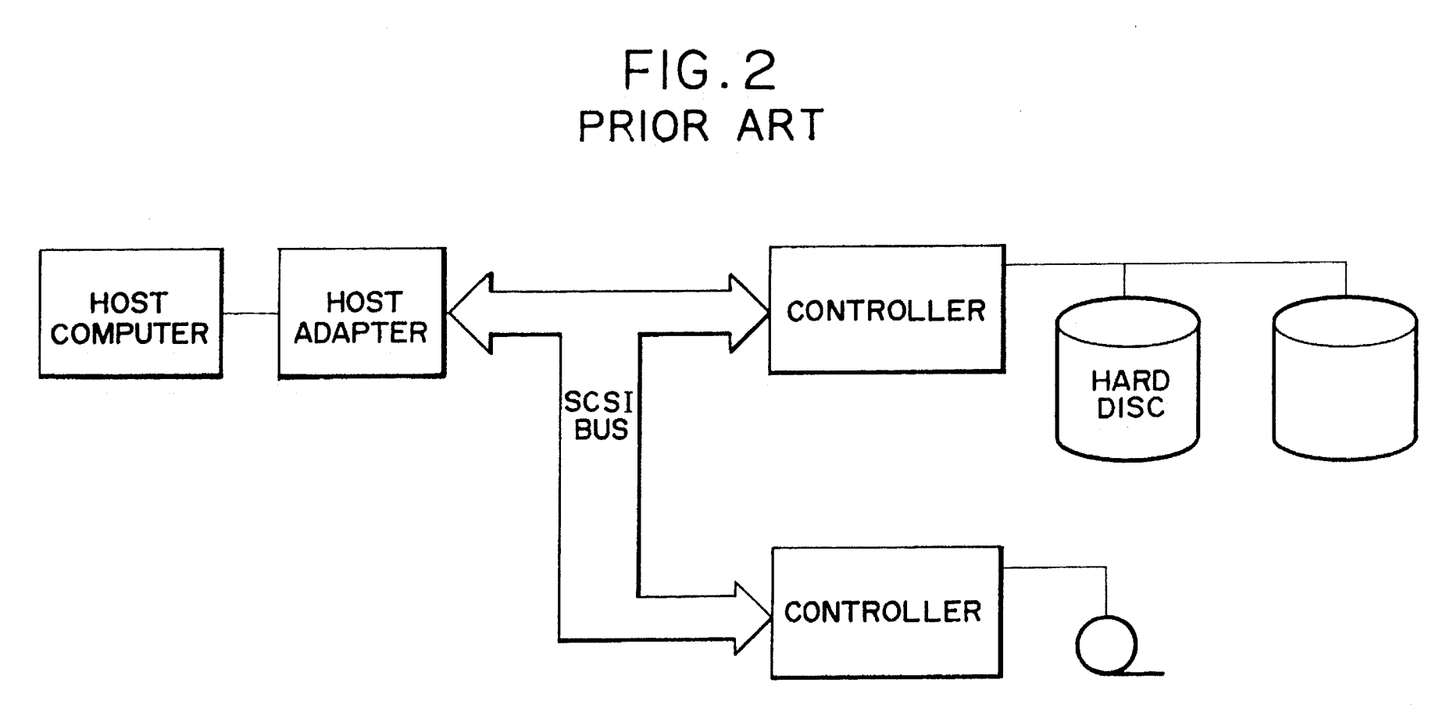
FIG. 2 is a block diagram showing a construction of a conventional general SCSI system.

FIG. 2 is a diagram showing a general example of a system construction of SCSI. As a logic unit, generally, as shown in FIG. 2, there are many cases where a physical device such as a hard disc or the like is connected. The logical unit number (LUN) can be assigned to the physical device or also can be assigned to a virtual device. In SCSI, ordinarily, eight logic units of LUN=0 to 7 can be connected to an SCSI bus. Further, by using an expansion message, up to 2048 logic units can be connected.

On the other hand, as an information recording medium, hitherto, a floppy disk to magnetically record and/or reproduce information, an optical information recording medium to optically record and/or reproduce information by using light, and the like are known. Various types such as disk shape, card shape, tape shape, and the like are known as a form of the optical information recording medium. Among such optical information recording media, the card-shaped optical information recording medium (hereinafter, referred to as an optical card) is small and light and is conveniently portable and a large demand is expected as an information recording medium of a relatively large capacity. The information recording medium is mainly classified into a type in which information can be erased and rewritten and a type in which the recorded information cannot be erased and rewritten in accordance with the characteristics of the medium. In general, the information of the optical card cannot be erased and rewritten, so that an application of the optical card is expected in the field such as a medical field or the like in which a fact that the recorded information cannot be rewritten becomes an advantageous.

As mentioned above, on the other hand, since the optical card is generally of the unerasable and unrewritable type, for instance, in the case where directory information or the like which ordinarily consists of several tens of bytes is recorded onto the optical card in which a data capacity of one track is equal to 512 bytes or 1024 bytes, the remaining portion of one track becomes vain and the data capacity cannot be effectively used. Therefore, there is also proposed an optical card in which a plurality of sectors can be recorded on one track. In such an optical card, a plurality of sector types of different data capacities are prepared. For instance, in a case of the sectors such that a data capacity of one sector is equal to 1024 bytes, one sector is arranged in one track and is used for data recording. In a case of the sectors such that a data capacity of one sector is equal to 32 bytes, 12 sectors are arranged in one track and are used for recording a directory. Due to this, the information capacity of an optical card can be effectively used. In the SCSI system, however, there is a rule such that when information is recorded and reproduced by using the logic block address mentioned above, the logic blocks are handled as the same size (capacity). Therefore, the sectors in which data capacities (sector sizes) per sector differ as in the above optical card cannot be collectively used. Recording and reproducing commands also can be obviously prepared as vendor unique commands for every sector size. When the number of kinds of sector sizes is large, however, a number of vendor unique commands to execute the same recording and reproduction as a function exist, so that it is undesirable from a viewpoint of the compatibility with the other devices.

SUMMARY OF THE INVENTION

It is an object of the invention to solve the problems of the conventional techniques as mentioned above and to provide a data recording and/or reproducing method which can effectively use an information capacity of a recording medium by allowing sectors of different data capacities to collectively exist.

According to the invention, the above object is accomplished by a method of performing either the recording or reproduction of data by using an information processing system comprising a recording/reproducing apparatus for executing at least one of the recording of data on and reproduction of data from a recording medium on which a plurality of data tracks are formed, a controller to control the recording/reproducing apparatus, and a host computer connected to the controller through a small computer interface, wherein the method comprises the steps of: sending a partition command signal for dividing said data track into a plurality of logic partitions and for designating a sector size which is used in each of the partitions from the host computer to the controller through the small computer interface; storing parameters regarding the partition division and sector size into a memory in the controller on the basis of the partition command signal sent from the host computer; sending a selection command signal for designating either one of the divided partitions from the host computer to the controller through the small computer interface; and controlling the information recording/reproducing apparatus by the controller so as to execute either the recording or reproduction of the data to the data track of the partition designated by the selection command signal in accordance with the parameters stored in the memory.

DETAILED DESCRIPTION OF THE PREFERRED EMBODIMENT

Figure 3:
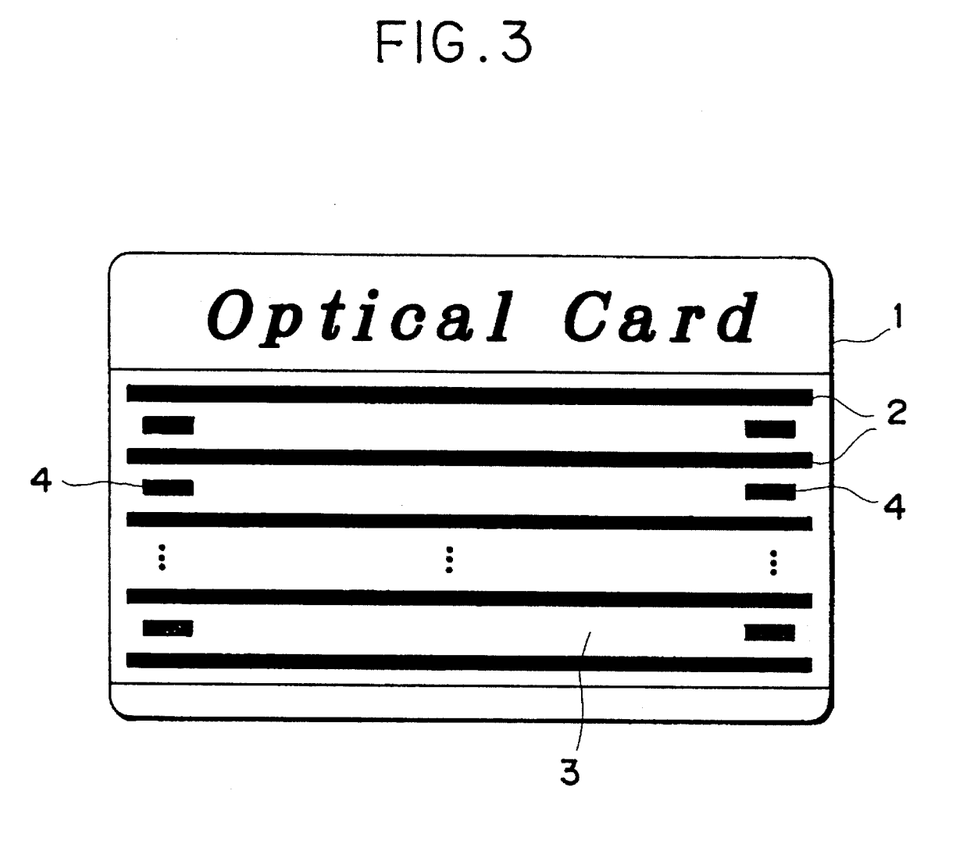
FIG. 3 is a plan view showing an example of a format of an optical card which is used as a recording medium in the invention.

An embodiment of the invention will be described in detail hereinbelow with reference to the drawings. A construction of an optical card used as an information recording medium in an information recording/reproducing method of the embodiment will be first explained. FIG. 3 is a plan view showing an example of the optical card. A plurality of tracking tracks 2 are provided in parallel on an optical card 1. A data track 3 to record information is provided between the adjacent tracking tracks 2, respectively. Physical track numbers 4 indicative of the physical position of the data track 3 have previously been formatted at both edges of the data track 3. The physical track numbers 4 are set in a manner such that the lower edge side of the optical card 1 is set to No. 0 and the number increases as the position approaches the upper edge side and the top edge is set to No. 2499. That is, No. 2500 data tracks 3 are provided on the optical card 1.

Figure 4:
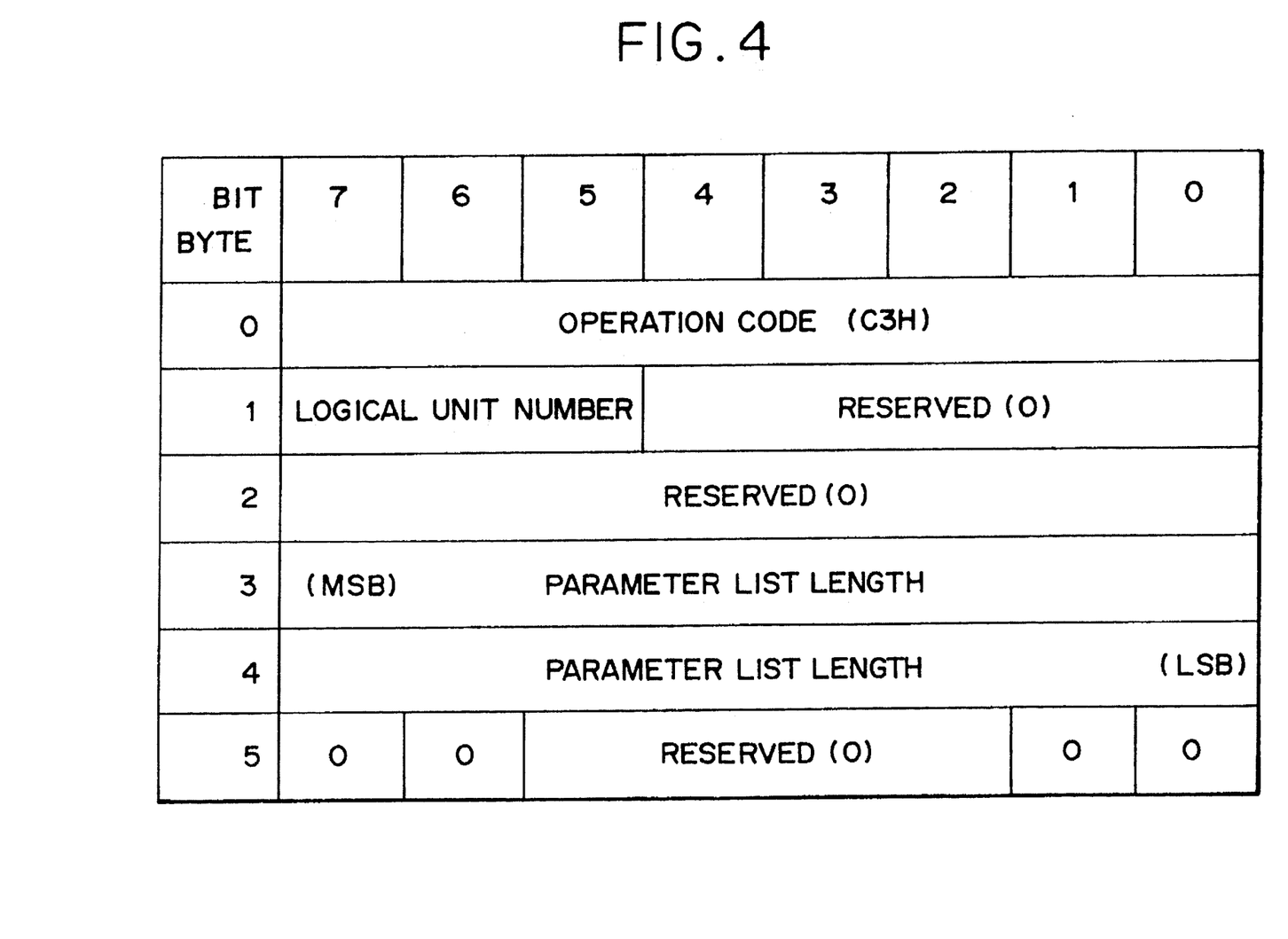
FIG.4 is a schematic diagram showing an embodiment of a construction of a partition command signal which is used in the invention.
Figure 5:
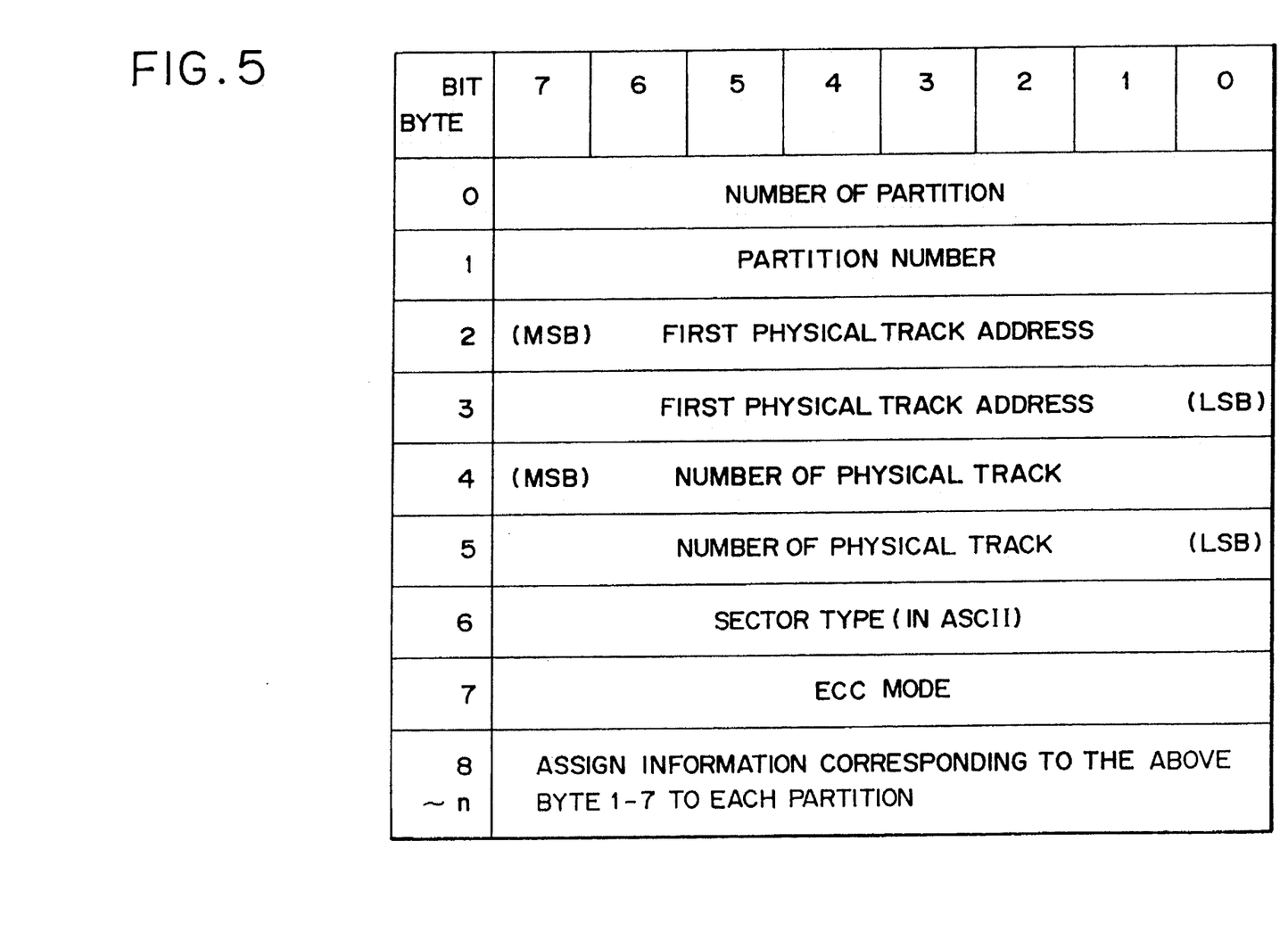
FIG. 5 is a schematic diagram showing an embodiment of a construction of a partition parameter which is included in the partition command signal in FIG. 4.

FIG. 4 is a diagram showing an example of a construction of the CDB of a command (partition command) for dividing the information recording medium into a plurality of logic partitions and for designating the sector size which is used in each of the partitions. In FIG. 4, an Operation Code of the byte 0 indicates a code number of the command. In the example shown, a code C3H (H indicates a hexadecimal number) is given as a vendor unique command of the group 6. The logical unit number of a target device is given to the Logical Unit Number of the bits 7 to 5 of the byte 1. Parameter list lengths shown in FIG. 5 are given to the bytes 3 and 4. The lengths of parameters differ depending on the number of partitions to be divided. All of the bits 4 to 0 of byte 1, the byte 2, and the byte 5 are set to 0.

FIG. 5 is a diagram showing an example of a construction of a parameter (partition parameter) which is transferred from the host computer by a partition command. In the example of FIG. 5, not only the sector size which is used in the partition but also a mode regarding whether information is recorded with an ECC (error correction code) or not can be designated. In the example of FIG. 5, the number of partitions of the byte 0 indicates the number of partitions to be divided. Such a byte is designated only once in the above parameter. A Partition Number of the byte 1 indicates the partition number. In the example shown, the numbers must start from 0 and be continuous. A first Physical Track Address of each of the bytes 2 and 3 indicates the first physical track number of the partition and must be (the final physical track number of one preceding partition)+1. A Number of Physical Track of each of the bytes 4 and 5 indicates the number of physical tracks which belong to the partition. A Sector Type of the byte 6 designates the sector type number shown in the following Table 1 by the ASCII codes (30H to 36H).

TABLE I

| Type | Sector/Track | User Byte/Sector (with/without ECC) |
|------|--------------|-------------------------------------|
| 0 | 1 | 1368/1680 |
| 1 | 1 | 1024/1296 |
| 2 | 2 | 512/720 |
| 3 | 4 | 256/400 |
| 4 | 6 | 128/240 |
| 5 | 8 | 64/144 |

TABLE I-continued

| Type | Sector/Track | User Byte/Sector (with/without ECC) |
|------|--------------|-------------------------------------|
| 6    | 12           | 32/96                               |

Further, an ECC Mode of the byte 7 designates whether the recording is executed with ECC or not. "0" indicates the recording without ECC. "1" indicates the recording with ECC. In the above, each of the divided partitions is provided with the bytes 1 to 7. The information corresponding to the bytes 1 to 7 about the next partition is designated in the byte 8 and subsequent bytes. In the designation of the parameters mentioned above, the parameters must be designated in a manner such that one or more physical tracks certainly exist in one partition. The partitions must not be designated in a manner such that there is a physical track which none of the partitions belongs or that one physical track belongs to a plurality of partitions. For instance, in the case where the optical card 1 is divided into two partitions (0 and 1) as shown in the following Table 2 and the partition 0 is used to record data and the partition 1 is used to record directory, the partition parameters are set to 02H, 00H, 00H, 00H, 07H, D0H, 31H, 01H, 01H, 07H, D0H, 01H, F4H, 36H, and 01H.

TABLE 2

|                       | Partition 0 | Partition 1 |
|-----------------------|-------------|-------------|
| The number of tracks  | 2000        | 500         |
| Sector type           | 1           | 6           |
| ECC mode              | With ECC    | With ECC    |

Figure 6:
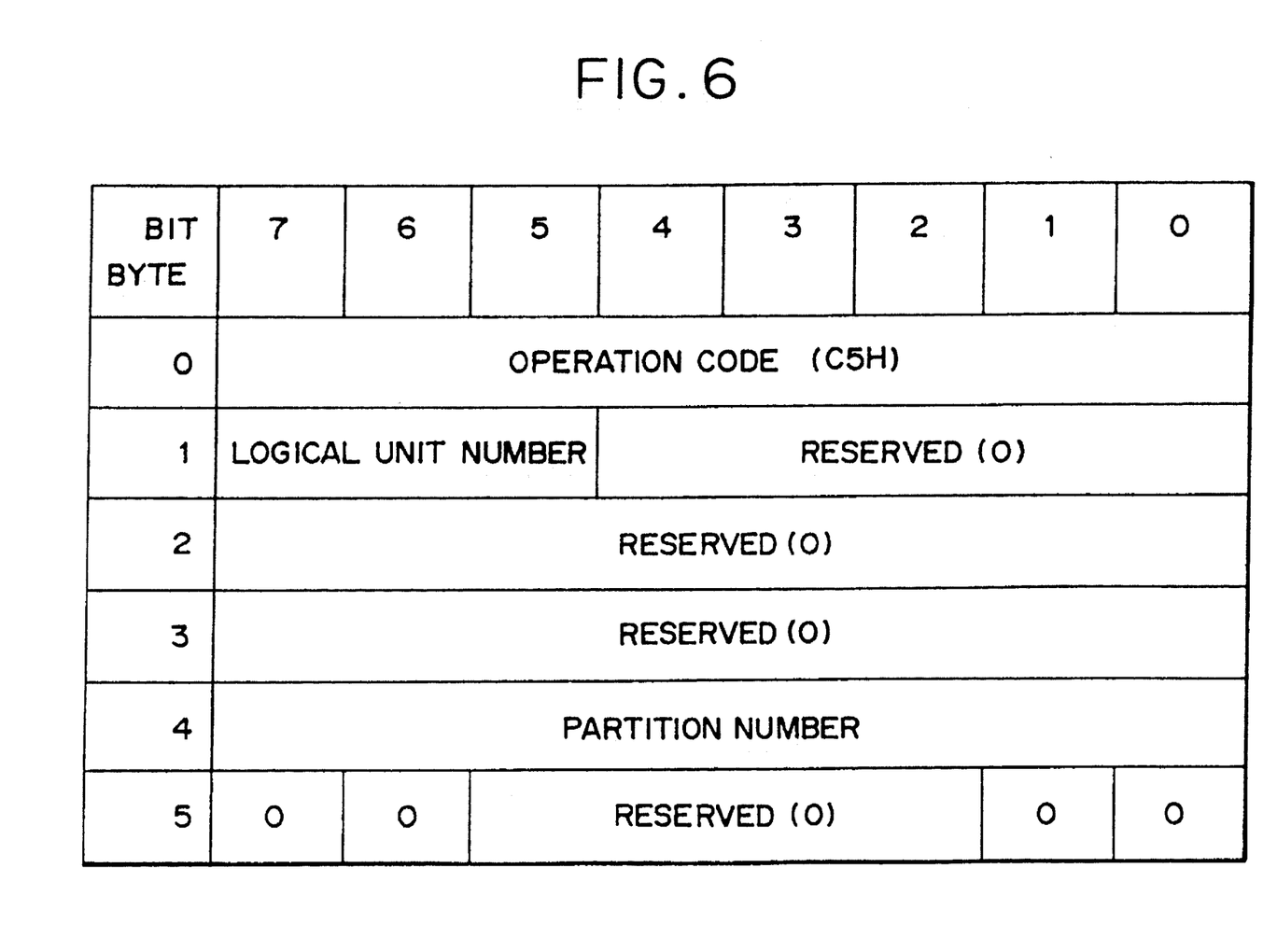
FIG. 6 is a schematic diagram showing an embodiment of a construction of a selection command signal which is used in the invention.

FIG. 6 is a diagram showing an example of a construction of CDB of an SAP (Select Active Partition) command to designate the partition to be used for recording and reproducing according to the embodiment. Operation Code of the byte 0 indicates a code number of the command. In the example shown, a code C5H is given as a vendor unique command of the group 6. The logic unit number of the target device is given to the Logical Unit Number of the bits 7 to 5 of the byte 1. The number of the partition (active partition) to be used for recording and reproducing is given to the byte 4. All of the bits 4 to 0 of the byte 1 and the bytes 2, 3, and 5 are set to "0".

Figure 7:
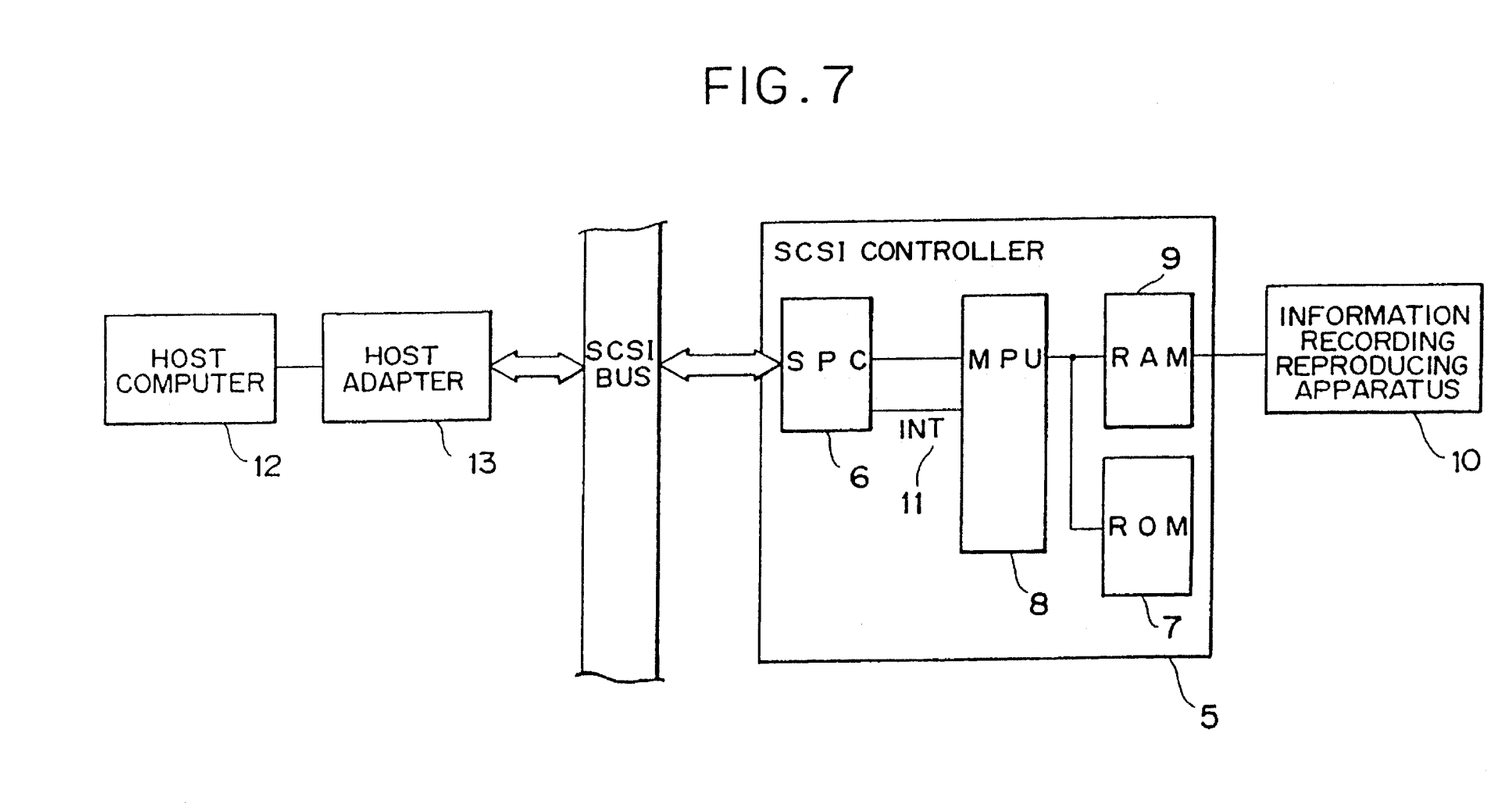
FIG. 7 is a block diagram showing an example of a construction of an SCSI system which is used in the invention.

FIG. 7 is a block diagram showing an example of an SCSI system according to an information recording/reproducing method of the invention. In FIG. 7, reference numeral 5 denotes an SCSI controller. The SCSI controller 5 is constructed by an SCSI protocol circuit (SPC) 6 to sequence control the SCSI signal on the basis of the SCSI standard, a micro processing unit (MPU) 8 as a control unit to control the SCSI controller 5 in accordance with a program stored in a read only memory (ROM) 7, and a random access memory (RAM) 9 which is used as a buffer memory or the like. An information recording/reproducing apparatus 10 is connected to the SCSI controller 5. The optical card 1 shown in FIG. 3 is inserted in the apparatus 10. Reference numeral 13 in the diagram denotes a host adapter.

In the above arrangement, until a partition command is given from the host computer 12, the SCSI controller 5 interprets the optical card 1 inserted in the information recording/reproducing apparatus 10 in a manner such that the whole surface of the card corresponds to one partition and the sector type is the type 1 and the recording is executed with ECC, so that the SCSI controller 5 executes a command such as recording, reproduction, or the like for the optical card 1. In this case, as for the logic block address which is designated in the CDB of the recording/reproducing command (in a case of the SCSI command, each command of Write and Read), the data track at the lowest edge of the card is set to address=0 and the address number increases as the data track approaches the upper edge.

The case where the partition command has been given will now be described. It is now assumed that the SCSI controller 5 has been selected by the host computer 12. In this case, since the SCSI controller 5 has been selected, an interrupting command 11 is generated from the SPC 6 to the MPU 8. The MPU 8 controls the SPC 6 and shifts the phase of the SCSI bus to the command phase and receives the command. It is now assumed that the received command is the partition command of C3H. In this case, the MPU 8 controls the SPC 6 and shifts to the data out phase and receives the parameters shown in FIG. 5 and stores the information of each partition into the RAM 9. The parameters received in this instance assume the parameters which have already been described in the above example. After completion of the transfer of the parameters, the status phase and the message in phase are executed and the processing routine for the partition command is finished.

From the above operations, the SCSI controller 5 interprets the optical card 1 inserted in the information recording/reproducing apparatus 10 in a manner such that the whole surface of the card is divided into two partitions designated by the parameters and each partition is of the sector type similarly designated by the parameters and the recording is executed in the ECC mode. However, since the partition to be used is not yet designated, the SCSI controller 5 interprets that the partition to be used for recording and reproducing is the partition 0, so that the SCSI controller executes the command for recording, reproducing, or the like to the optical card 1. In this case, now assuming that the physical track number of the data track at the lowest edge of the card is equal to 0, since the partition 0 is constructed by one sector/track, the logical block address and the physical track number coincide. The ECC mode designated by the parameters for the partition 0 of the partition command is obviously used.

The case where the SAP command (C5H) has been given will now be described. When the received command is the SAP command, the active partition is designated by the byte 4 in the CDB. It is now assumed that the partition 1 has been designated as an active partition. On the basis of the partition information stored in the RAM 9, the MPU 8 interprets that the recording and reproducing commands are for the partition 1 until the next SAP command is subsequently given, so that the MPU 8 executes the recording and reproducing commands. That is, necessary operation parameters in the SCSI controller are set such that the number of bytes which are transferred in the data transfer phase (data in phase, data out phase) is determined on the basis of the sector type and ECC mode designated by the parameters of the partition command, or the like.

Figure 8:
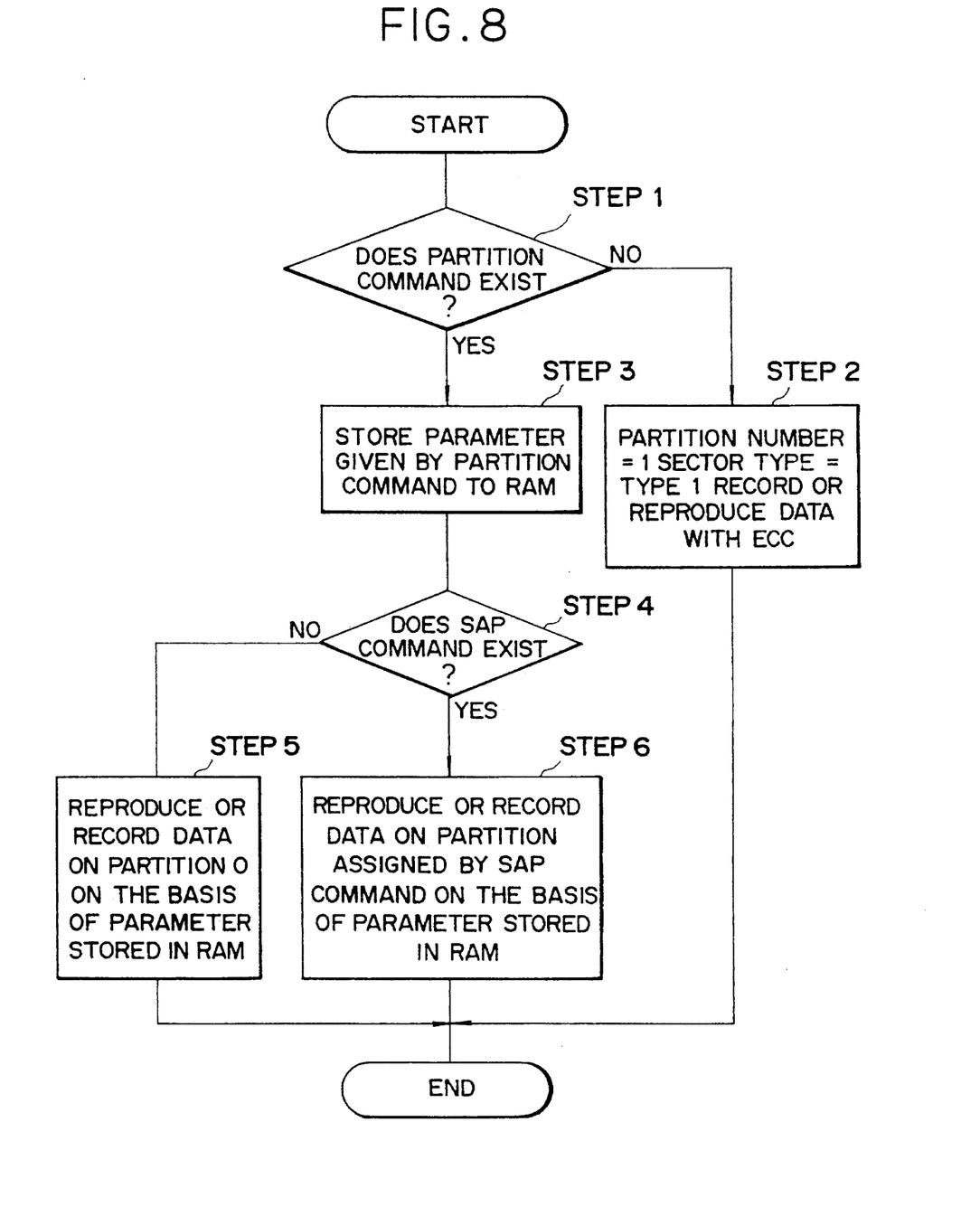
FIG. 8 is a flowchart for explaining an embodiment of a data recording method of the invention.

FIG. 8 is a flowchart showing an embodiment of an information recording/reproducing method of the invention described above. In FIG. 8, a check is first made in step 1 to see if the partition command has been sent from the host computer to the SCSI controller or not. If NO, step 2 follows and the whole surface of the optical card is set to one partition and the sector type of the partition is set to the type 1 and the data is recorded or reproduced.

When the partition command is sent from the host computer in step 1, the processing routine advances to step 3 and the parameter designated by the partition command is stored into the RAM. In the next step 4, a check is made to see if the SAP (Select Active Partition) command has been sent from the host computer to the SCSI controller or not. If NO, step 5 follows and the data is recorded into or reproduced from the partition 0 on the basis of the parameter stored in the RAM.

When the SAP command is sent in step 4, step 6 follows and the data is recorded into or reproduced from the partition designated by the SAP command on the basis of the parameter stored in the RAM.

The correspondence relation between the logical block address and the physical track number is as described below.

Generally, now assuming that the physical track number and the sector number start from 0, there are the following relations among the logical block address, the physical track number, and the sector number.

---

$Tr\# = Tf + int(LBA/M)$
$Sct\# = MOD(LBA/M)$
where, Tr#: physical track number
Sct#: sector number
Tf: first physical track number of the partition
M: the number of sectors per track in the sector type
LBA: logical block address
int( ): function to obtain an integer part in the parenthesis
MOD( ): function to obtain the remainder of the calculation in the parenthesis.

---

For instance, the partition 1 starts from the data track of the physical track number 2000 (7D0H) and the sector type is the type 6 and is constructed by 12 sectors/track, so that Tf=2000 (7D0H) and M=12. Therefore, the sectors of the logical block address=0 are as follows.

$Tr\# = 2000 + int(0/12) = 2000$
$Sct\# = MOD(0/12) = 0$

Those sectors correspond to the sectors at the leftmost edge of the track having the physical track number 2000. Similarly, the sectors of the logical block address =100 are as follows.

$Tr\# = 2000 + int(100/12) = 2008$
$Sct\# = MOD(100/12) = 4$

Those sectors correspond to the sectors of the sector number 4 of the data track having the physical track number 2008 (7D8H).

The partition command in the embodiment is strictly logical and a physical recording such as a boundary of the partition or the like is never performed on the optical card. Therefore, the partition information which has once been set can be again changed by using the partition command. That is, as used in the above example, if it is determined that 1000 tracks are sufficient for the partition 0 while the partition is divided into two types of partitions of 2000 tracks and 500 tracks and is being used, the remaining 1000 tracks can be defined as a new partition 1 and the original partition 2 can be defined as a new partition 3. In the partition command of the embodiment, it is necessary that all of the tracks belong to either one of the partitions. Therefore, in the case where only two partitions each including 500 tracks are actually needed, by defining the remaining 1500 tracks as the third partition, if a need arises, such a partition can be again newly defined as, for instance, two partitions each including 750 tracks (namely, the partition is consequently divided into four partitions as a whole) which also can be used.

On the other hand, since the partition is strictly logical, a problem occurs in the case when the partition dividing state (sector type or ECC mode) of the optical card which has actually been inserted into the recording/reproducing apparatus differs from the partition parameter of the partition command generated from the host computer. To avoid such a problem, when the partition information which has once been set does not need to be changed after that by the host computer, it is desirable to record the partition information onto the optical card. In the above example, in a default state until the partition command is generated, the sector type is set to the type 1 and the ECC mode is set to the recording mode with ECC. There fore, for instance, prior to using the optical card, the partition information to be set is recorded onto the first track in the above default state. After that, the optical card is actually used in a desired partition division state. When such a card is inserted into the information recording/reproducing apparatus at the second time, the partition information recorded on the first track is read and the partition is divided by using the partition command on the basis of the read-out partition information. Due to this, the above problem can be avoided. In the above example, since the maximum number of divisions is equal to 128, the partition parameter is set to up to 897 (=1+7×128) bytes. As in the above example, even when the partition information is recorded onto the optical card, one track of the sector type 1 is merely consumed.

In the partition parameter shown in the above embodiment, the partition range has been defined by the first physical track number and the number of physical tracks included in the partition. However, the partition range also can be defined by the first physical track number and the last physical track number. The number of user bytes per sector of the sector type used in the embodiment and the number of sectors per track are not limited to the above values but also can be set to arbitrary numbers.

What is claimed is:

1. A method of performing either the recording or reproduction of data by using an information processing system that includes a recording/reproducing apparatus for executing at least one of the recording of data on and reproduction of data from a recording medium on which a plurality of data tracks are provided, a controller to control the recording/reproducing apparatus, and a host computer which is connected to the controller through a small computer interface, said method comprising the steps of:

sending a partition command signal to divide the data tracks into a plurality of logical partitions and to designate a sector size which is used in each of the partitions from the host computer to the controller through the small computer interface, wherein each of the partitions includes a different number of data tracks and the designated sector sizes are also different;

storing parameters regarding the partition division and the sector size into a memory in the controller on the basis of the partition command signal sent from the host computer;

sending a selection command signal to designate any one of the divided partitions from the host computer to the controller through the small computer interface; and controlling the information recording/reproducing apparatus by the controller so as to perform either one of the recording of the data to the data track and reproduction of the data from the data track of the partition designated by the selection command signal, in accordance with the parameters stored in the memory.

2. A method according to claim 1, further comprising the steps of:

sending a parameter indicating whether or not an error correction code is added to the data to be recorded to each of the partitions from the host computer to the controller through the small computer interface; and storing a parameter regarding the error correction code into the memory in the controller.

3. A method according to claim 1, further comprising assigning a physical track address to each of the data tracks, wherein the parameters include the physical track address of the first data track of each partition and the number of data tracks included in each partition.

4. A method according to claim 1, wherein in the case of recording the data before the partition command signal is sent from the host computer, the controller controls the recording/reproducing apparatus so as to set all of the data tracks into one partition and set one data track into one sector and to add the error correction code and record the data.

5. A method according to claim 1, wherein in the case of recording the data before the selection command signal is sent from the host computer, but subsequent to the partition command signal being sent from the host computer, the controller controls the recording/reproducing apparatus so as to record the data into the first partition in accordance with the parameters stored in the memory.

6. A method according to claim 1, wherein the recording medium is an optical card.

* * * * *